United States Patent
Rohner

[11] 3,815,426
[45] June 11, 1974

[54] MEASUREMENT OF SPEED OF ROTATION BY SONIC AND ULTRASONIC FREQUENCIES SPECTRUM

[75] Inventor: Dieter Rohner, Hausen, Germany

[73] Assignee: Akzona Incorporated, Asheville, N.C.

[22] Filed: Aug. 7, 1972

[21] Appl. No.: 278,586

[30] Foreign Application Priority Data
Aug. 17, 1971  Germany............................ 2141068

[52] U.S. Cl....................... 73/488, 73/506, 73/518
[51] Int. Cl..................... G01p 3/14, G01p 3/42
[58] Field of Search...... 73/488, 518, 506, 67, 70.2, 73/69; 181/.5 NP; 324/166

[56] References Cited
UNITED STATES PATENTS

| | | | |
|---|---|---|---|
| 2,174,176 | 9/1939 | Journeaux............................... | 73/67 |
| 2,361,990 | 11/1944 | Brown................................... | 73/67 |
| 2,425,811 | 8/1947 | Kent.............................. | 324/166 X |
| 2,679,629 | 5/1954 | Hellar, Jr. ....................... | 324/166 X |
| 3,665,306 | 5/1972 | Orth.................................... | 324/174 |

Primary Examiner—James J. Gill
Attorney, Agent, or Firm—Johnston, Keil, Thompson & Shurtleff

[57] ABSTRACT

Apparatus and process wherein the center frequency of the narrow-band level peak of the sonic and ultrasonic spectrum produced by the false-twisting machine, which is directly proportional to the rotational speed of the spindles, is used for rotational speed measurement on false-twist spindles.

3 Claims, 4 Drawing Figures

MEASUREMENT OF SPEED OF ROTATION BY SONIC AND ULTRASONIC FREQUENCIES SPECTRUM

This invention relates to a method for the substantially absolute measurement of rotational speed on false-twist spindles in the absence of any drive contact.

Hitherto, measurement of the rotational speed of head spindles of the kind used in false-twist texturing machines using an inductive pickup has only been possible up to speeds of approximately 300,000 r.p.m. It has only been possible indirectly to measure rotational speed on encapsulated center hole units. Since in this case it has only been the rotational speed of the supporting rollers which has been measured by means of an optical pickup, the rotational speed of the spindles has had to be assessed by deduction. The results have been correspondingly inaccurate.

The object of the invention is to provide a method by which contactless rotational speed measurement can be carried out in a direct, substantially absolute manner even at speeds far in excess of 300,000 r.p.m.

According to the invention, this object is achieved by virtue of a method for contactless, absolute rotational speed measurement on false-twist spindles which is distinguished by the fact that the center frequency of the narrow-band level peak of the sonic and ultrasonic spectrum produced by the false-twisting machine, which is strictly proportional to the rotational speed of the spindles, is used for rotation measurement.

Investigation of the noise spectrum of a false-twisting machine which extends into the ultrasonic range reveals in particular a narrow-band level peak which is caused by the vibrations induced by the spindles. The spindle induced vibrations function on the principle of a rotary shutter siren. The center frequency of the level peak is strictly proportional to the rotational speed and is therefore used for measuring the rotational speed. In another procedure, the noise spectrum of a certain type of machine is picked up by an ultrasonic directional microphone and a filter adjusted to the level peak. The filter with a band width of from 5 to 50 kc/s suppresses all the spurious frequencies, e.g., higher harmonics, and all the effects of airborne noise emanating from the machine shop. The isolated signals are subsequently amplified and converted by means of a Schmitt trigger into an impulse form best suited to the actual measurement (rectangular impulses). The threshold value of the Schmitt trigger is adjusted in such a way that any other interfering signals are ignored.

Accordingly, further measurement comprises counting rectangular impulses. These counting pulses pass through a gate circuit which is triggered by a quartz-controlled time-base generator. The gate circuit is opened for such a definite period that, after the impulses have been subsequently counted, the rotational speed of the spindles is directly digitally indicated in revolutions per minute.

Accordingly, a substantially absolute indication with an accuracy within 0.01 percent error (about 1 revolution per 10,000 revolutions per minute) is obtained.

The invention also relates to measuring apparatus for carrying out the process which accordingly consists of an ultrasonic directional microphone for picking up the sonic and ultrasonic spectrum and of a combination of units for processing the resulting signals, i.e., a filter with a band width of 5 to 50 kc/s, an amplifier, a Schmitt trigger whose threshold value can be adjusted, a gate circuit, counting circuit and digital indicating circuit, the gate circuit having associated with it a quartz-controlled time-base generator with a pulse shaper and count-down circuit.

The invention is illustrated in the accompanying drawings, wherein.

Figure 1:
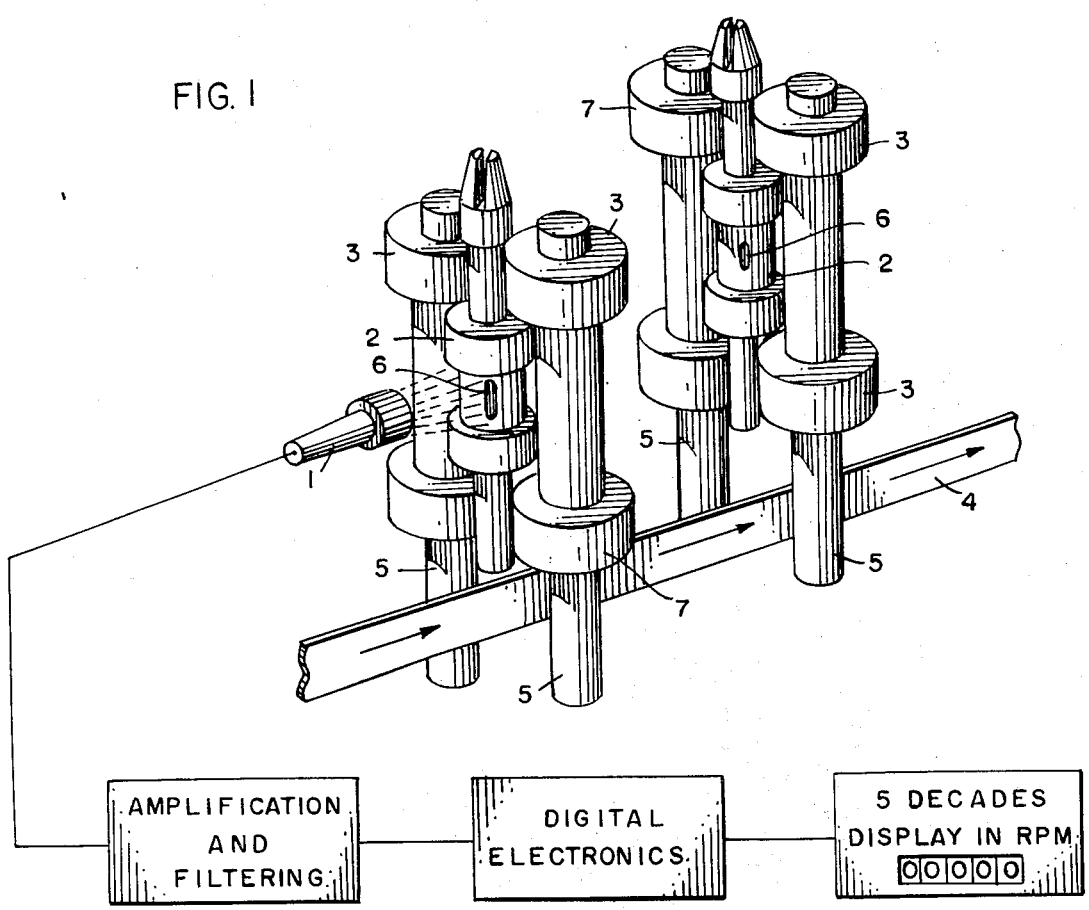
FIG. 1 is a perspective view of a segment of a false-twist spindle machine with an ultrasonic directional microphone positioned to pick up sonic and ultrasonic vibrations induced by the rotating spindle.
Figure 2:
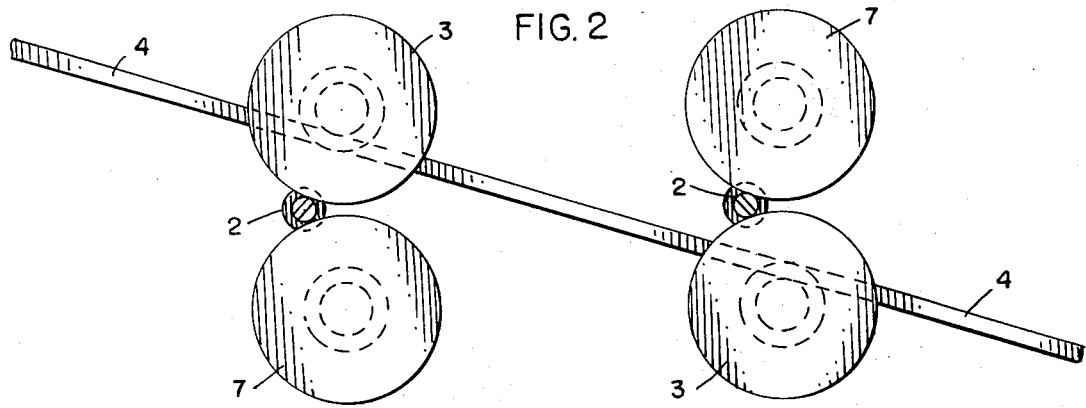
FIG. 2 is a top plan view of the machine segment of FIG. 1.

According to FIG. 1, the ultrasonic directional microphone 1 is directed onto the center hole 6 of the spindle 2 in order to obtain as high a signal-to-sonic and ultrasonic, rotationally-induced vibration ratio as possible. The center hole 6 is usual on most modern false twist spindles. The invention can be practiced with spindles not having a center hole, in which case the microphone is directed toward the spindle in the area of its greatest rotationally-induced vibration output, e.g., substantially as shown in FIG. 1. Since each spindle 2 is driven by the drive belt 4 through the supporting drive rollers 3, the rotational speed of the spindles is governed by the diameter of the wharve 5. Alternate drive rollers 7 may be driven by belt 4 to rotate the spindles in the opposite direction. Change from one drive roller to the other is achieved through conventional mechanisms (not shown) for moving the respective drive rollers toward and away from the belt 4. Comparison of the rotational speeds of the spindles with the ideal values derived from the speed of the belt and the diameter of the wharve occasionally reveals excessively high true rotational speeds. This means that the supporting drive roller wharve is showing signs of wear. For example, diameter reductions of $2.3\mu$ (1.9977 instead of 2.0000 mm) were readily detected during operation by the method according to the invention. This was accompanied by a change in the rotational speed from 588,000 r.p.m. to 588,700 r.p.m.

Figure 3:
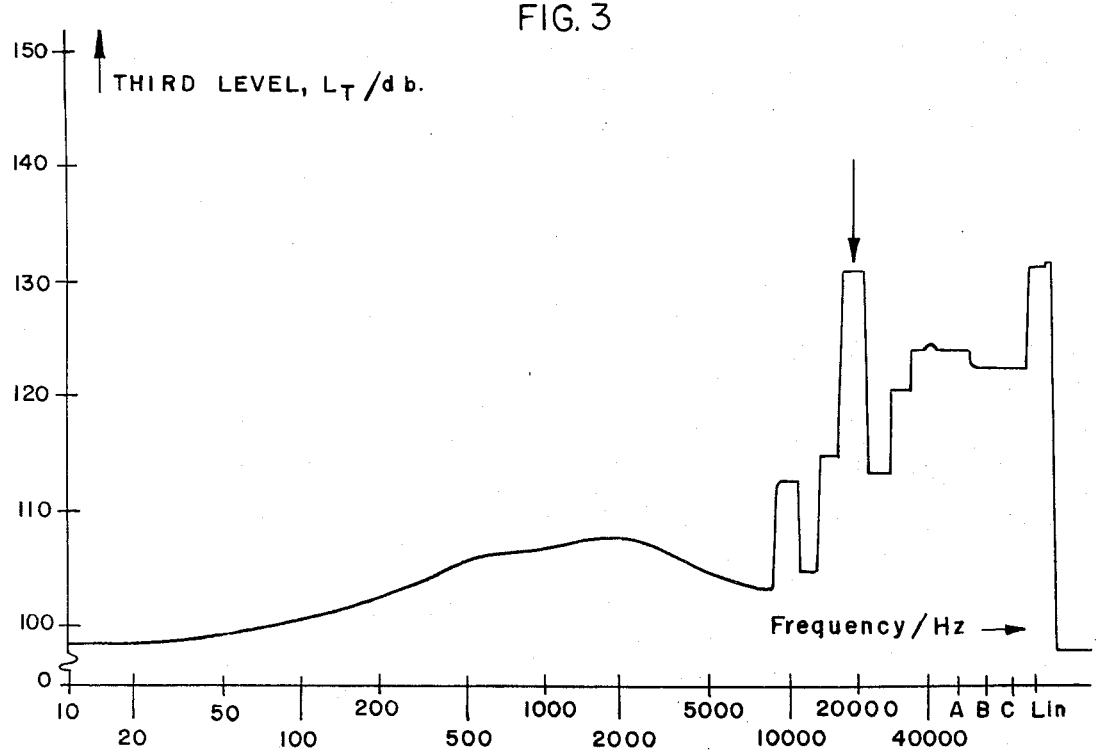
FIG. 3 shows the third level spectrum of the false-twist spindles of a Barmag FK-4 false-twist machine.

FIG. 3 shows the third level spectrum of a Barmag FK-4 false-twist machine. The narrow-band level peak indicated by an arrow which corresponds to the spindle-induced vibrations is clearly noticeable.

The third level spectrum designates the sound quantum or pressure for the third level ($L_T$), measured in decibels (db). The third level is a frequency band in the progression of band level, octave level (musical) third level, etc. For purposes of the invention, a portion of the third level spectrum covering a frequency band of about 5 kc/s to about 50 kc/s is used.

The sound quantum level L in decibels ($L_T$ for the third level) is by the equation: $L = 20 \log P/Po$, i.e., 20 times the logarithm (base 10) of the ratio of the effective values of the sound pressure (P) measured in the designated frequency range and the reference sound pressure (Po). The reference sound pressure is 20 $\mu N/M^2$. For more detailed explanation, reference is made to German published Standard DIN 45633, March 1970.

The designations "A, B, C" on the abscissa of FIG. 3 pertain to the sound pressure levels evaluated with the evaluation curves A, B, C of DIN 45633. "Lin" designates the unevaluated sound pressure level. In each case, measurement was carried out over the entire third level spectrum.

Figure 4:
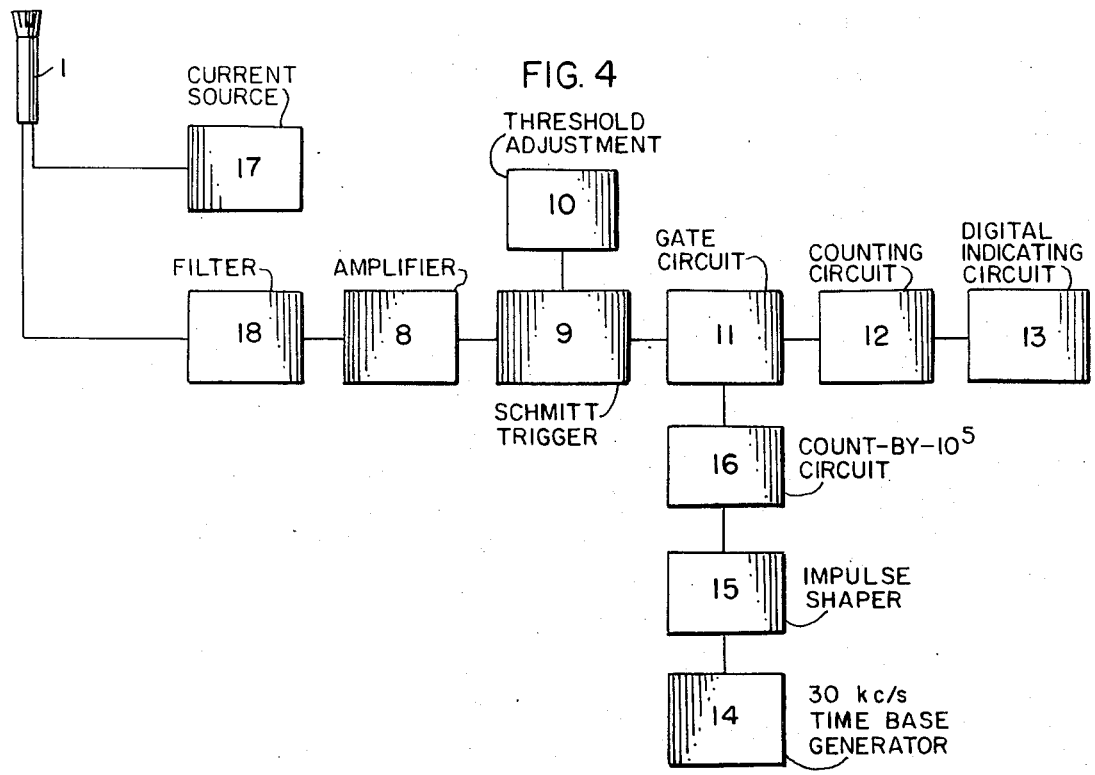
FIG. 4 is a block diagram of the electrical and electronic components for contactless rotational speed measurement of false-twist spindles.

FIG. 4 shows an electrical and electronic unit for contactless rotational speed measurement on false-twist spindles comprising an ultrasonic directional microphone 1 (including its current supply 17), a filter 18 with a band width of from 5 to 50 kc/s, an amplifier 8, a Schmitt trigger 9 with threshold adjustment 10, a gate circuit 11, a counting circuit 12 and a digital indicating circuit 13. The gate circuit 11 has associated with it a quartz-controlled 30 kc/s time-base generator 14, an impulse shaper 15 and a count-by-$10^5$ circuit 16. The picked up signals, as modified by the Schmitt trigger 9, pass through gate circuit 11 — the time base generator 14 controlling the opening of the gate.

All the electronic units are known per se and may be purchased in the form of integrated building blocks. The units can be combined on the building block principle into a small, handy, portable package.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A method for contactless, substantially absolute rotational speed measurement of a false-twist spindle, which comprises picking up by an ultrasonic directional microphone the sonic and ultrasonic vibration spectrum produced by the spindle of a false-twisting machine, filtering the picked up signals by a filter with a sonic and ultrasonic band width and converting the center frequency of the narrow-band level peak of said filtered band width within a frequency range of about 5 to 50 kc/s, which center frequency is directly proportional to the rotational speed of the spindle, into speed of rotation measurement units.

2. A method as claimed in claim 1, wherein the isolated signals are counted electronically, and the rotational speed of the spindles is converted electronically directly into digitally indicated revolutions per minute.

3. Apparatus for contactless, substantially absolute rotational speed measurement of a false-twist spindle which comprises an ultrasonic directional microphone for picking up the sonic and ultrasonic spectrum of a false-twist machine, and means for converting the signals picked up by the microphone into digitally indicated speed of rotation measurement units, said means embodying in series connection a filter with a band width of 5 to 50 kc/s, an amplifier, a Schmitt trigger with treshold value adjustment means, a gate circuit, a counting circuit and a digital indicating circuit, the gate circuit having operatively associated with it in series connection a quartz-controlled time-base generator, an impulse shaper and a count-down circuit, said Schmitt trigger modifying the picked up signals, the signals so modified passing through said gate circuit, and said time base generator controlling the opening of the gate.

* * * * *